(12) United States Patent  
Ozdemir et al.

(10) Patent No.: US 9,279,899 B2  
(45) Date of Patent: Mar. 8, 2016

(54) SYSTEM AND TECHNIQUE TO ESTIMATE PHYSICAL PROPAGATION PARAMETERS ASSOCIATED WITH A SEISMIC SURVEY

(75) Inventors: Ahmet Kemal Ozdemir, Asker (NO); Philippe Caprioli, Hosle (NO); Ali Ozbek, Milton (GB); Johan Olof Anders Robertsson, Grantchester (GB)

(73) Assignee: WesternGeco L.L.C., Houston, TX (US)

( * ) Notice: Subject to any disclaimer, the term of this patent is extended or adjusted under 35 U.S.C. 154(b) by 1319 days.

(21) Appl. No.: 11/779,797

(22) Filed: Jul. 18, 2007

(65) Prior Publication Data

US 2009/0022009 A1    Jan. 22, 2009

(51) Int. Cl.
*G01V 1/00* (2006.01)
*G01V 1/36* (2006.01)
*G01V 1/38* (2006.01)

(52) U.S. Cl.
CPC .............. *G01V 1/364* (2013.01); *G01V 1/3808* (2013.01); *G01V 2210/56* (2013.01)

(58) Field of Classification Search
CPC .. G01V 1/364; G01V 1/3808; G01V 2210/56
USPC ........... 367/15, 16, 17, 18, 19, 20, 21, 22, 23, 367/24; 702/17, 14
See application file for complete search history.

(56) References Cited

U.S. PATENT DOCUMENTS

| | | | |
|---|---|---|---|
| 5,051,961 A | | 9/1991 | Corrigan et al. |
| 5,260,911 A | * | 11/1993 | Mason et al. .................... 367/57 |
| 5,729,506 A | * | 3/1998 | Dragoset et al. ................ 367/24 |
| 6,681,887 B1 | * | 1/2004 | Kragh et al. ................... 181/110 |
| 8,086,426 B2 | * | 12/2011 | El Ouair et al. .................... 703/2 |
| 2004/0145968 A1 | | 7/2004 | Brittan et al. |
| 2005/0073909 A1 | * | 4/2005 | Laws et al. ...................... 367/15 |
| 2005/0075791 A1 | | 4/2005 | Lailly et al. |
| 2006/0190181 A1 | * | 8/2006 | Deffenbaugh et al. .......... 702/14 |
| 2006/0203611 A1 | * | 9/2006 | Robertsson et al. ............. 367/13 |
| 2007/0091719 A1 | * | 4/2007 | Falkenberg et al. ............. 367/19 |

FOREIGN PATENT DOCUMENTS

GB       2 407 416       4/2005

OTHER PUBLICATIONS

Amundsen, "Rough-sea deghosting of streamer seismic data using pressure gradient approximations," *Geophysics*, 70(1):V1-V9, 2005.
Amundsen, "Wave-number-based filtering of marine point-source data," *Geophysics*, 58(9):1335-1348, 1993.
International Search Report, dated Oct. 27, 2008, for PCT/US2008/068033.
Moldeaveanu, et al., Over/Under Towed-Streamer Acquisition, The Leading Edge, Jan. 2007, p. 41 to 58.
Ozdemir, Optimized Deghosting of Over Under Towed Streamer, The Leading Edge, Feb. 2008, p. 190 to 199.

* cited by examiner

*Primary Examiner* — Krystine Breier

(57)    ABSTRACT

A technique includes estimating propagation parameters that are associated with a towed seismic survey based at least in part on seismic signal measurements and noise measurements.

33 Claims, 4 Drawing Sheets

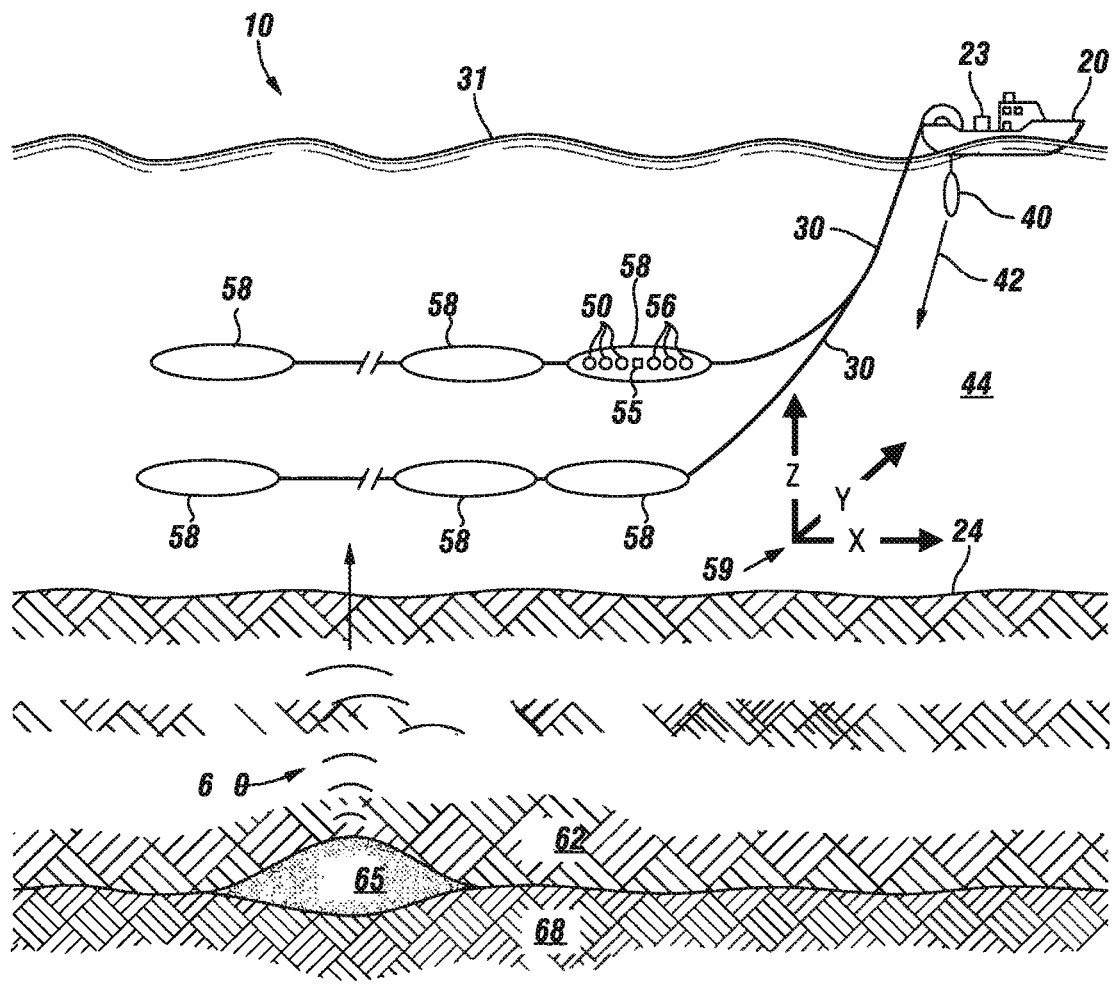
F I G . 1

SYSTEM AND TECHNIQUE TO ESTIMATE PHYSICAL PROPAGATION PARAMETERS ASSOCIATED WITH A SEISMIC SURVEY

BACKGROUND

The invention generally relates to a system and technique to estimate physical propagation parameters that are associated with a seismic survey.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy that is emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes estimating propagation parameters that are associated with a towed seismic survey based at least in part on seismic signal measurements and noise measurements.

In another embodiment of the invention, a system includes an interface and a processor. The interface receives data that is indicative of seismic signal measurements and noise measurements. The processor processes the data to estimate propagation parameters that are associated with a towed seismic survey based at least in part on the seismic signal measurements and the noise measurements.

In yet another embodiment of the invention, an article includes a computer accessible storage medium to store instructions that when executed by a processor-based system cause the processor-based system to obtain data indicative of seismic signal measurements and noise measurements, and process the data to estimate propagation parameters that are associated with a towed seismic survey based at least in part on the seismic signal measurements and the noise measurements.

Advantages and other features of the invention will become apparent from the following drawing, description and claims.

BRIEF DESCRIPTION OF THE DRAWING

FIG. 1 is a schematic diagram of a marine seismic acquisition system according to an embodiment of the invention.

DETAILED DESCRIPTION

Figure 2:
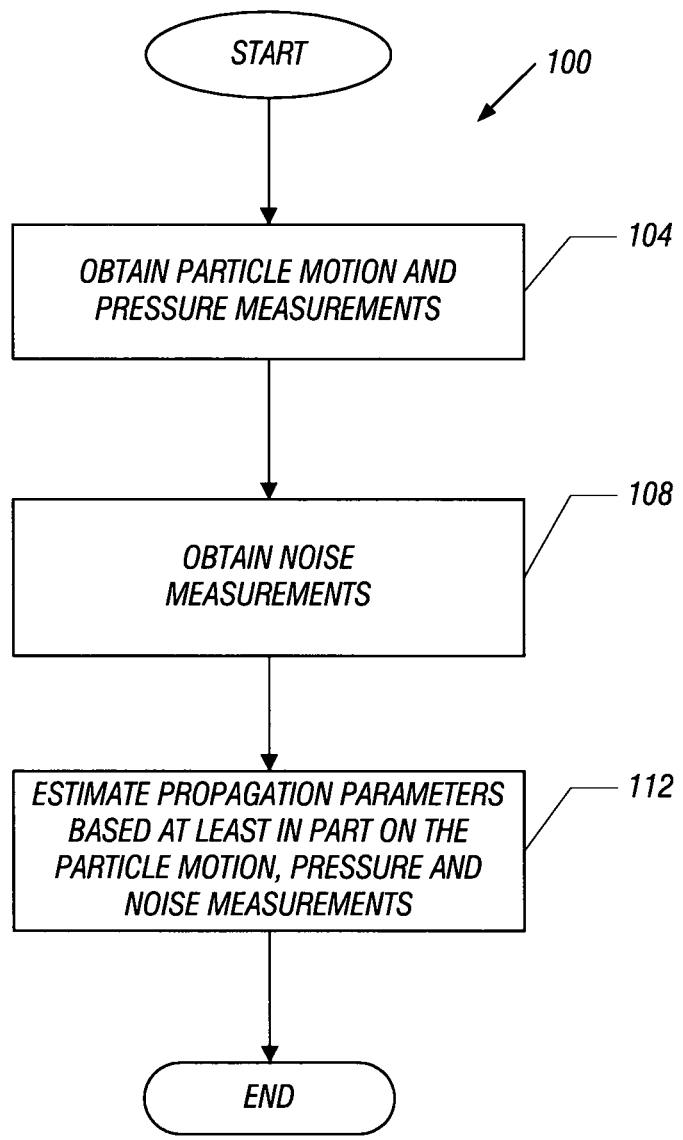
FIGS. 2 and 3 are flow diagrams depicting techniques to estimate propagation parameters associated with a towed seismic survey according to embodiments of the invention.

FIG. 1 depicts an embodiment 10 of a marine seismic data acquisition system in accordance with some embodiments of the invention. In the system 10, a survey vessel 20 tows one or more seismic streamers 30 (two exemplary streamers 30 being depicted in FIG. 1) behind the vessel 20. The seismic streamers 30 may be several thousand meters long and may contain various support cables (not shown), as well as wiring and/or circuitry (not shown) that may be used to support communication along the streamers 30.

Each seismic streamer 30 contains seismic sensors, which record seismic signals. In accordance with some embodiments of the invention, the seismic sensors are multi-component seismic sensors 58, each of which is capable of detecting a pressure wavefield and at least one component of a particle motion that is associated with acoustic signals that are proximate to the multi-component seismic sensor 58. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor 58 may include one or more hydrophones, geophones, particle displacement sensors, particle velocity sensors, accelerometers, pressure gradient sensors, or combinations thereof.

For example, in accordance with some embodiments of the invention, a particular multi-component seismic sensor 58 may include a hydrophone 55 for measuring pressure and three orthogonally-aligned accelerometers 50 to measure three corresponding orthogonal components of particle velocity and/or acceleration near the seismic sensor 58. It is noted that the multi-component seismic sensor 58 may be implemented as a single device (as depicted in FIG. 1) or may be implemented as a plurality of devices, depending on the particular embodiment of the invention. A particular multi-component seismic sensor 58 may also include pressure gradient sensors 56, which constitute another type of particle motion sensor. The pressure gradient sensor measures the change in the pressure wavefield at a particular point with respect to a particular direction. For example, one of the pressure gradient sensors 56 may acquire seismic data indicative of, at a particular point, the partial derivative of the pressure wavefield with respect to the crossline direction, and another one of the pressure gradient sensors may acquire, at a particular point, seismic data indicative of the pressure data with respect to the inline direction.

The marine seismic data acquisition system 10 includes one or more seismic sources 40 (one exemplary source 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are acquired by the sources 40 produce corresponding reflected acoustic signals, or pressure waves 60, which are sensed by the multi-component seismic sensors 58. It is noted that the pressure waves that are received and sensed by the multi-component seismic sensors 58 include "up going" pressure waves that propagate to the sensors 58 without reflection, as well as "down going" pressure waves that are produced by reflections of the pressure waves 60 from an air-water boundary 31.

The multi-component seismic sensors 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular multi-component seismic sensor 58 may provide a trace, which corresponds to a measure of a pressure wavefield by its hydrophone 55; and the sensor 58 may provide one or more traces that correspond to one or more components of particle motion, which are measured by its accelerometers 50.

Figure 4:
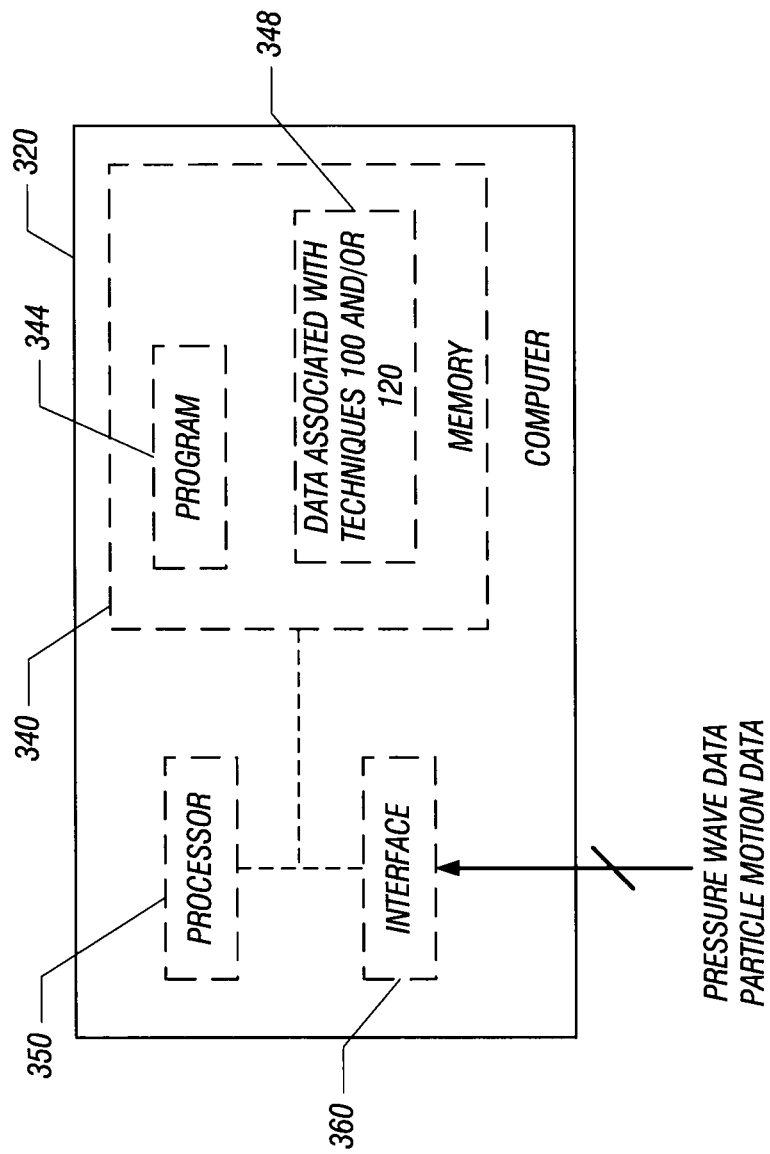
FIG. 4 is a schematic diagram of a seismic data processing system according to an embodiment of the invention.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system (such as an exemplary seismic data processing system 320 that is depicted in FIG. 4 and is further described below) that may be, for example, located on land or on the vessel 20. Thus, many variations are possible and are within the scope of the appended claims.

The down going pressure waves create an interference known as "ghost" in the art. Depending on the incidence angle of the up going wavefield and the depth of the streamer 30, the interference between the up going and down going wavefields creates nulls, or notches, in the recorded spectrum. These notches may reduce the useful bandwidth of the spectrum and may limit the possibility of towing the streamers 30 in relatively deep water (water greater than 20 meters (m), for example).

The technique of decomposing the recorded wavefield into up and down going components is often referred to as wavefield separation, or "deghosting." The particle motion data that is provided by the multi-component seismic sensors 58 allows the recovery of "ghost" free data, which means data that is indicative of the upgoing wavefield.

Many seismic data processing algorithms use a physical propagation model, which is characterized by physical propagation parameters. These parameters may include, as examples, streamer depth, acoustic sound velocity and the reflection coefficient of the sea surface.

As a more specific example, a deghosting algorithm is a seismic data processing algorithm that relies on the physical propagation model, such as the one described, for example, in U.S. patent application Ser. No. 11/740,641, entitled, "Method for Optimal Wave Field Separation," which was filed on Apr. 25, 2007. The deghosting algorithm provides an estimate of the upgoing pressure wavefield in a towed marine seismic survey when measurements from a vector streamer (i.e., a streamer providing particle motion and pressure measurements) are available. The deghosting algorithm may rely on a measurement model that is described as follows:

$$M = HP_u + N \quad \text{Eq. 1}$$

where "M," "H," and "N" represent measurement, transfer function and measurement noise, vectors, respectively; and "$P_U$" represents the upgoing pressure wavefield. More specifically, the M, H and N vectors may be described as follows:

$$M = [P \ V_x V_y V_z]^T, \quad \text{Eq. 2}$$

$$H = \quad \text{Eq. 3}$$

$$\left[ (1 + \xi_e^{j4\pi k_z z_s}) \frac{ck_x}{f} (1 + \xi_e^{j4\pi k_z z_s}) \frac{ck_y}{f} (1 + \xi_e^{j4\pi k_z z_s}) \frac{ck_z}{f} (1 - \xi_e^{j4\pi k_z z_s}) \right]^T$$

$$N = [N_p N_x N_y N_z]^T, \quad \text{Eq. 4}$$

where the superscript "T" represents the transpose operation, "P" represents the pressure measurement; "$V_x$," "$V_y$" and "$V_z$," represents the inline, crossline and vertical components of the particle velocities; "$N_p$" represents the noise on pressure measurement; and "$N_x$," "$N_y$," and "$N_z$," represents the respective measurement noises on particle velocity measurements. Regarding the propagation parameters of the H vector, "$\xi$" represents the reflection coefficient of the sea surface; "$z_s$" represents the streamer depth; "c" represents the acoustic speed of sound in water; "$k_z$" represents the vertical wavenumber; and "f" represents the frequency. The vertical wavenumber $k_z$ is related to the horizontal wavenumbers $k_x$, $k_y$, and the frequency f through the following relation:

$$k_z = \frac{f}{c}\sqrt{1 - c^2 \frac{k_x^2 + k_y^2}{f^2}}. \quad \text{Eq. 5}$$

For purposes of deghosting the pressure wavefield, the optimal estimate (called "$\hat{P}_u$") of the upgoing pressure wavefield may be expressed as follows:

$$\hat{P}_u = \frac{H^T C^{-1}}{H^T C^{-1} H} M, \quad \text{Eq. 6}$$

where "C" represents the noise covariance matrix, which is defined as follows:

$$C = E[NN^T]. \quad \text{Eq. 7}$$

In Eq. 7, "E[ ]" represents the statistical expectation operator. It is noted the covariance matrix C may thus be computed from the noise vector N, and the noise vector N may be derived, for example, using an estimate of a portion of the particle motion/pressure measurement, which contains only the noise record.

As shown by Eq. 6, the deghosting algorithm is an example of many seismic data processing algorithms, which depend on the determination of the physical propagation parameters, which characterize the vector H (see Eq. 3). One technique to determine the physical propagation parameters involves minimizing the "cross ghost." The cross ghost is defined as the signal obtained by applying a pressure ghost operator on the vertical velocity measurements; applying the corresponding vertical velocity ghost operator on the pressure measurement; and computing the difference. In the absence of noise and in a data window after the direct arrival, the cross ghost is zero when the ghost operator matches to the correct physical propagation channel. Otherwise, the cross ghost is non-zero. A difficulty with this approach, however, is that the effect of the noise is not considered, which may be present in the velocity and pressure measurements. In this regard, when one measurement contains significantly more noise than the other measurement, the correct propagation parameters do not constitute the minima of the cross ghost. As a result, the obtained estimates are usually biased, and thus, incorrect.

In accordance with embodiments of the invention, which are described herein, the propagation parameters for a marine survey are determined by taking into account the effect of noise in the measurements. More specifically, referring to FIG. 2, a technique 100 to determine the propagation parameters includes obtaining (block 104) particle motion and pressure measurements and obtaining (block 108) noise measurements. The propagation parameters are estimated based at least in part on the particle motion, pressure and noise measurements, pursuant to block 112.

Turning now to the more specific details, for purposes of estimating the propagation parameters, a cost function called "$J(\alpha)$" is defined in terms of the measurement vector M, the noise covariance matrix C and the unknown transfer function vector H, as set forth below:

$$J(\alpha) = M^T C^{-1} M - \frac{|M^T C^{-1} H(\alpha)|^2}{H(\alpha)^T C^{-1} H(\alpha)}.\qquad\text{Eq. 8}$$

In Eq. 8, the cost function J is expressed as a function of an unknown parameter vector (called "$\alpha$"), which parameterizes the vector H, described above in Eq. 3. As a specific example, the vector $\alpha$ may contain such propagation parameters as the streamer depth $z_s$, the acoustic speed of sound c and/or the reflection coefficient $\xi$ (as just a few examples). Depending on the information available and/or possibly other factors, the $\alpha$ vector may include only these parameters, may include fewer parameters, or may include more parameters. Thus, many variations are possible and are within the scope of the appended claims.

For purposes of simplifying the J cost function, a singular value decomposition of the covariance matrix may be expressed as follows:

$$C = U\Lambda U^T, \qquad\text{Eq. 9}$$

where "U" represents an orthogonal matrix, and "$\Lambda$" represents a diagonal matrix. Assume the following definition of matrices:

$$\overline{M} = U^T M, \text{and} \qquad\text{Eq. 10}$$

$$\overline{H} = U^T H. \qquad\text{Eq. 11}$$

For these definitions, the cost function $J(\alpha)$ may be expressed as follows:

$$J(\alpha) = \frac{\sum_{i<j}\frac{|\overline{H}_j(\alpha)\overline{M}_i - \overline{H}_i(\alpha)\overline{M}_j|^2}{\sigma_i^2 \sigma_j^2}}{\sum_i \frac{|\overline{H}_i(\alpha)|^2}{\sigma_i^2}}, \qquad\text{Eq. 12}$$

where "$\overline{H}_j(\alpha)$" and "$\overline{M}_j$" represent the j-th entry of the vectors "$\overline{H}(\alpha)$" and "$\overline{M}$", respectively; and "$\sigma_j^2$" represents the j-th diagonal entry of the diagonal matrix $\Lambda$.

The expected value of the cost function J, $E[J(\alpha)]$, equals one when the vector $\alpha$ is the correct model parameter vector and $E[J(\alpha')]$ is greater than one for any other $\alpha'$, giving way to the following relationship:

$$E[J(\alpha')] = 1 + \frac{1}{2}|P_u|^2 \frac{\sum_{i\ne j}\frac{|\overline{H}_i(\alpha')\overline{H}_j(\alpha) - \overline{H}_j(\alpha')\overline{H}_i(\alpha)|^2}{\sigma_i^2 \sigma_j^2}}{\sum_i \frac{|\overline{H}_i(\alpha')|^2}{\sigma_i^2}} > 1, \qquad\text{Eq. 13}$$

for $\alpha' \ne \alpha$.

Having established the fact that $E[J(\alpha)]$ is minimized only when the correct model parameters are used, an estimator for the parameter vector $\alpha$ may be expressed as follows:

$$\hat{\alpha} = \operatorname*{argmin}_{\alpha} E[J(\alpha)] = \frac{\sum_{i<j}\frac{E\left[|\overline{H}_j(\alpha)\overline{M}_i - \overline{H}_i(\alpha)\overline{M}_j|^2\right]}{\sigma_i^2 \sigma_j^2}}{\sum_i \frac{|\overline{H}_i(\alpha)|^2}{\sigma_i^2}} \qquad\text{Eq. 14}$$

In accordance with some embodiments of the invention, the statistical expectation operation may be approximated by averaging the results of several measurement realizations. If a single realization of the measurement vector M is used, the statistical expectation operation may be approximated as follows:

$$E[J(\alpha)] \approx \iiint_{f,k_x,k_y} \frac{\sum_{i<j}\frac{|\overline{H}_j(\alpha)\overline{M}_i - \overline{H}_i(\alpha)\overline{M}_j|^2}{\sigma_i^2 \sigma_j^2}}{\sum_i \frac{|\overline{H}_i(\alpha)|^2}{\sigma_i^2}} df\, dk_x\, dk_y. \qquad\text{Eq. 15}$$

Equation 15 represents an approximation to the ensemble average (i.e., the statistical expectation operation) by frequency and wavenumber average. For purposes of reducing edge effects, the integrand of Eq. 15 may be convolved (represented by the operator "*") with a low pass function (called "W" below) before integration, as described below:

$$E[J(\alpha)] \approx \iiint_{f,k_x,k_y} W * \frac{\sum_{i<j}\frac{|\overline{H}_j(\alpha)\overline{M}_i - \overline{H}_i(\alpha)\overline{M}_j|^2}{\sigma_i^2 \sigma_j^2}}{\sum_i \frac{|\overline{H}_i(\alpha)|^2}{\sigma_i^2}} df\, dk_x\, dk_y. \qquad\text{Eq. 16}$$

Figure 3:
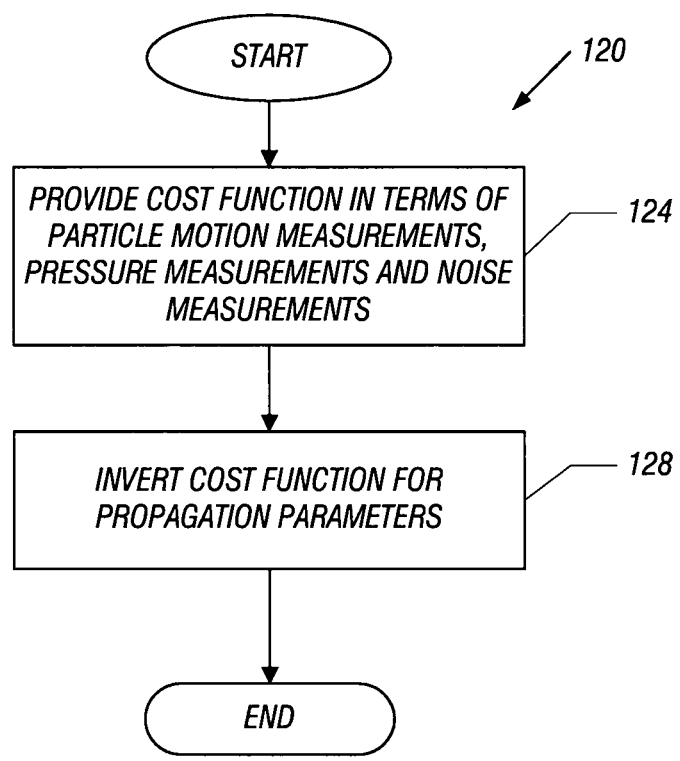

To summarize, in accordance with embodiments of the invention, a technique 120 that is depicted in FIG. 3 may be used. The technique 120 includes providing a cost function that is expressed in terms of pressure, particle motion and noise measurements, pursuant to block 124. The cost function is inverted (block 128) for the propagation parameters.

It is noted that the techniques that are disclosed herein may be used in "over/under" applications (applications that involve towing streamers at different depths) and "sea bed" applications (applications that involve placing seismic sensors on the sea bed).

Other variations are contemplated and are within the scope of the appended claims. For example, modifications may be made to the cost function to derive the same set of propagation parameters. For example, rather than minimizing the cost function that is set forth above in Eq. 8 and 12, the cost function may be changed and correspondingly maximized. Eq. 17 below sets forth one example of a cost function (called "J'($\alpha$)" below) that may be maximized (instead of minimized) to derive the propagation parameters:

$$J'(\alpha) = \frac{|M^T C^{-1} H(\alpha)|^2}{H(\alpha)^T C^{-1} H(\alpha)}. \qquad \text{Eq. 17}$$

It is noted that the techniques that are described herein may be used for calibration purposes, for instance, when the sensitivity of one measurement (e.g., particle motion data) is consistently different than the other set (e.g., pressure data). Thus, many variations and applications are contemplated and are within the scope of the appended claims.

Referring to FIG. 4, in accordance with some embodiments of the invention, a seismic data processing system 320 may perform the techniques that are disclosed herein for purposes of determining the physical propagation parameters of a marine survey. In this regard, the seismic data processing system 320 may, for example, store program instructions 344 in a memory 340, which when executed by a processor 350 cause the processor 350 (and system 320) to perform iterative numerical techniques to invert a cost function for purposes of determining the physical propagation parameters that are associated with a marine seismic survey.

In accordance with some embodiments of the invention, the processor 350 may includes one or more microprocessors and/or microcontrollers. The processor 350 may be located on a streamer 30 (FIG. 1), located on the vessel 20 or located at a land-based processing facility (as examples), depending on the particular embodiment of the invention.

The processor 350 may be coupled to a communication interface 360 for purposes of receiving seismic data that corresponds to pressure and particle motion measurements. Thus, in accordance with embodiments of the invention described herein, the processor 350, when executing instructions stored in a memory of the seismic data processing system 320, may receive multi-component data that is acquired by multi-component seismic sensors while in tow. It is noted that, depending on the particular embodiment of the invention, the multi-component data may be data that is directly received from the multi-component seismic sensor as the data is being acquired (for the case in which the processor 350 is part of the survey system, such as part of the vessel or streamer) or may be multi-component data that was previously acquired by the seismic sensors while in tow and stored and communicated to the processor 350, which may be in a land-based facility, for example.

As examples, the interface 360 may be a USB serial bus interface, a network interface, a removable media (such as a flash card, CD-ROM, etc.) interface or a magnetic storage interface (IDE or SCSI interfaces, as examples). Thus, the interface 360 may take on numerous forms, depending on the particular embodiment of the invention.

In accordance with some embodiments of the invention, the interface 360 may be coupled to the memory 340, which in addition to the program instructions 344 may store, for example, various raw, intermediate and final data sets involved with the techniques 100 and/or 120, as indicated by reference numeral 348. The program instructions 344, when executed by the processor 350, may cause the processor 350 to perform one or more parts of the techniques that are disclosed herein, such as the techniques 100 and/or 120 (as a more specific example) and display results of the processing (inversion results, for example) on a display (not shown) of the system 320.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
    determining a noise covariance from seismic signal measurements acquired in a seismic survey of a geologic structure in which energy propagates to and from the geologic structure through a medium; and
    estimating propagation parameters associated with the medium based at least in part on the seismic signal measurements and the determined noise covariance.

2. The method of claim 1, further comprising:
    using the estimated propagation parameters to estimate an upgoing pressure wavefield generated during the survey.

3. The method of claim 1, wherein the propagation parameters comprise a parameter selected from a sea surface reflection coefficient and a speed of sound.

4. The method of claim 1, wherein the seismic signal measurements comprise pressure measurements and particle motion measurements.

5. The method of claim 1, wherein the seismic survey comprises a survey generated using a towed streamer.

6. The method of claim 1, wherein the seismic survey comprises a survey generated using seismic sensors deployed on a seabed.

7. The method of claim 1, wherein estimating the propagation parameters comprises:
    providing a cost function in terms of the seismic signal measurements, the noise covariance and a propagation model that is a function of the propagation parameters; and
    inverting the cost function for the propagation parameters.

8. The method of claim 7, wherein the act of inverting comprises performing one of minimizing the cost function and maximizing the cost function.

9. The method of claim 7, wherein the act of inverting comprises determining an expected value of the cost function.

10. The method of claim 9, wherein the act of determining the expected value comprises averaging results obtained for several sets of the measurements to approximate the expected value.

11. The method of claim 9, wherein the act of determining the expected value comprises integrating the cost function over frequency and wave number space to estimate the expected value.

12. The method of claim 11, further comprising:
    convolving an integrand with a low pass function before performing the act of integrating.

13. The method of claim 9, wherein the act of inverting further comprises minimizing the expected value.

14. A system comprising:
    an interface to receive data indicative of seismic signal measurements and noise measurements associated with a towed seismic survey of a geologic structure in which energy waves propagate to and from the geologic structure through a medium; and a processor to process the data to determine a noise covariance characterizing the noise measurements and estimate propagation parameters associated with the medium based at least in part on the noise covariance and the seismic signal measurements.

15. The system of claim 14, wherein the propagation parameters comprises a parameter selected from a sea surface reflection coefficient and a speed of sound.

16. The system of claim 14, wherein the processor extracts the noise measurements from the seismic signal measurements.

17. The system of claim 14, wherein the seismic signal measurements comprise pressure measurements and particle motion measurements.

18. The system of claim 14, wherein the processor is adapted to:
    access a cost function in terms of the seismic signal measurements, the noise measurements and a propagation model that is a function of the propagation parameters; and
    invert the cost function for the propagation parameters.

19. The system of claim 14, further comprising:
    a streamer comprising seismic sensors to acquire the seismic signal measurements and the noise measurements.

20. The system of claim 19, wherein the processor is part of the streamer.

21. The system of claim 19, further comprising:
    a survey vessel to tow the streamer.

22. The system of claim 21, wherein the processor is located on the survey vessel.

23. An article comprising a computer accessible storage medium to store instructions that when executed by a processor-based system cause the processor-based system to:
    determine a noise covariance from seismic signal measurements acquired in a towed seismic survey of a geologic structure in which energy propagates to and from the geologic structure through a medium; and
    estimate propagation parameters associated with the medium based at least in part on the seismic signal measurements and the determined noise covariance.

24. The article of claim 23, wherein the propagation parameters comprises a parameter selected from a sea surface reflection coefficient and a speed of sound.

25. The article of claim 23, wherein the instructions when executed cause the processor-based system to extract the noise measurements from the seismic signal measurements.

26. The article of claim 23, wherein the seismic signal measurements comprise pressure measurements and particle motion measurements.

27. The article of claim 23, wherein the instructions when executed cause the processor-based system to:
    access a cost function that is defined in terms of the seismic signal measurements, the noise covariance and a propagation model that is a function of the propagation parameters; and
    invert the cost function for the propagation parameters.

28. The method of claim 1, further comprising:
    modeling the seismic signal measurements as a function of the noise measurements and the product of a transfer function and a seismic wavefield, wherein the processing is based at least in part on the modeling.

29. The method of claim 28, wherein the transfer function is characterized by the propagation parameters.

30. The system of claim 14, wherein the processor is adapted to estimate the propagation parameters based at least in part on a model of the seismic signal measurements as a function of the noise measurements and the product of a transfer function and a seismic wavefield.

31. The system of claim 30, wherein the transfer function is characterized by the propagation parameters.

32. The article of claim 23, the storage medium storing instructions that when executed by the processor-based system cause the processor-based system to estimate the propagation parameters based at least in part on a model of the seismic signal measurements as a function of the noise measurements and the product of a transfer function and a seismic wavefield.

33. The article of claim 31, wherein the transfer function is characterized by the propagation parameters.

* * * * *